Nov. 11, 1947. J. B. PARSONS Re. 22,933

WINDOW REGULATOR MECHANISM

Original Filed Jan. 30, 1943 2 Sheets-Sheet 1

Inventor
John B. Parsons

By Malcolm W. Green

Attorney

Nov. 11, 1947. J. B. PARSONS Re. 22,933

WINDOW REGULATOR MECHANISM

Original Filed Jan. 30, 1943 2 Sheets-Sheet 2

Inventor

John B. Parsons

By Malcolm W. Fraser

Attorney

Reissued Nov. 11, 1947

Re. 22,933

UNITED STATES PATENT OFFICE 22,933

WINDOW REGULATOR MECHANISM

John B. Parsons, Toledo, Ohio, assignor to Malcolm W. Fraser, Toledo, Ohio, as trustee Original No. 2,381,365, dated August 7, 1945, Serial No. 474,108, January 30, 1943. Application for reissue September 11, 1945, Serial No. 615,639

8 Claims. (Cl. 268—126)

This invention relates to regulator mechanism for vehicle windows such, for example, as used on automobile bodies, but more particularly for actuating windows to positions covering and uncovering window openings and in which the opposite edge portions of the window are guided for reciprocatory movement.

An object is to produce a new and improved window regulator of the above type having a pair of swinging arms adapted to be connected for window actuation and so designed that the structure can be manufactured inexpensively in large scale production and which is materially simpler in design than similar mechanisms heretofore in use and which can be readily and conveniently installed and operated.

Another object is to produce a vehicle window regulator mechanism having a pair of swinging arms which are operated by a rectilinearly shiftable member movable in a plane generally cross-wise to the plane of window movement.

A further object is to produce vehicle window regulator mechanism having a pair of bell crank levers which are compactly arranged and to which swinging movement is imparted by a longitudinally shiftable member movable in a plane generally cross-wise with respect to the plane of window movement.

A still further object is to produce a vehicle window regulator mechanism of the swinging arm type equipped with a new and improved counterbalancing spring means which is effective to impart substantially uniform counterbalancing force substantially throughout the movement of the swinging arms in one direction of window movement.

A still further object is to produce a vehicle window regulator mechanism equipped with a pair of substantially identical bell crank levers mounted for swinging movement about a common pivot and a longitudinally shiftable actuating member for said arms or levers.

Other objects and advantages of the invention will hereinafter appear and for purposes of illustration but not of limitation, embodiments of the invention are shown in the accompanying drawings in which Figure 1 is a side elevation of a regulator mechanism mounted in an automobile door, portions of the door being broken away to show the mechanism and viewed from the outside of the door;

Figure 1:
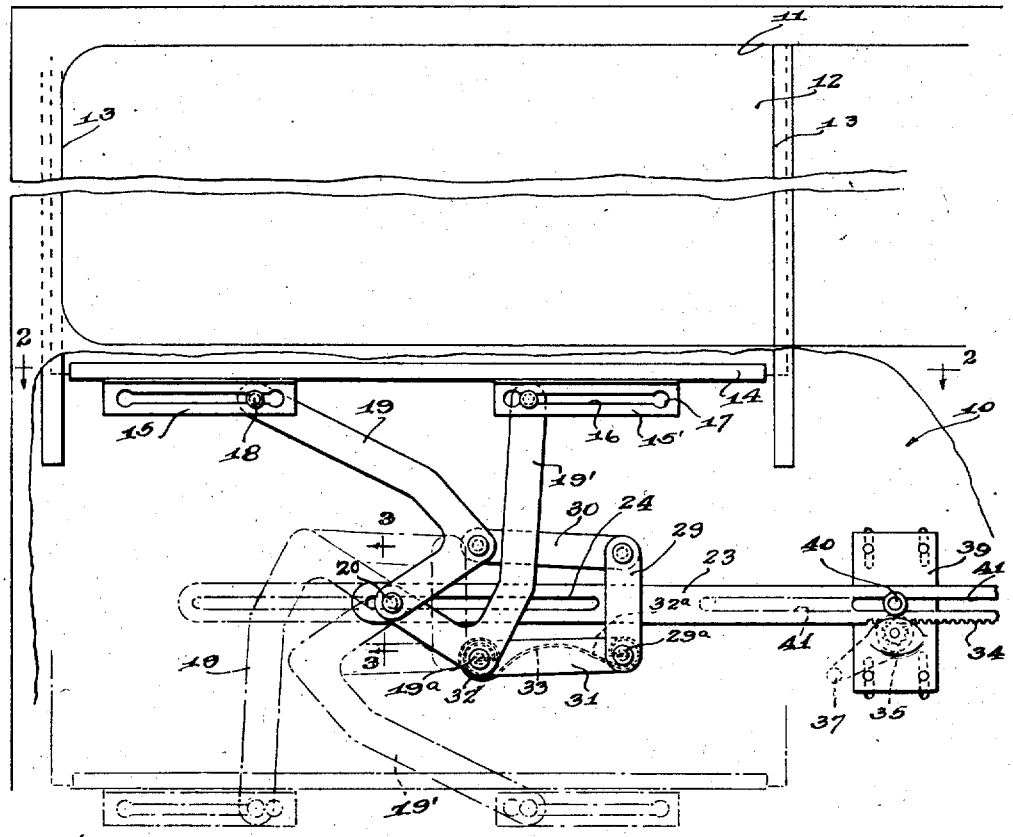
Figure 2:
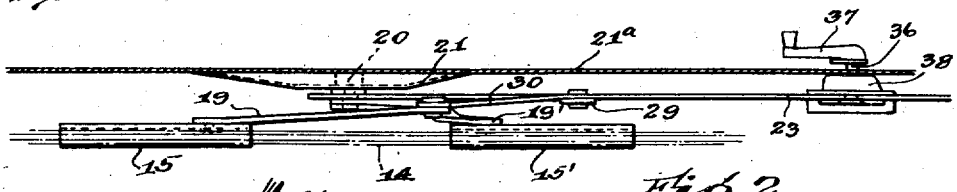
Figure 2 is a sectional elevation substantially on the line 2—2 of Figure 1.
Figure 3:
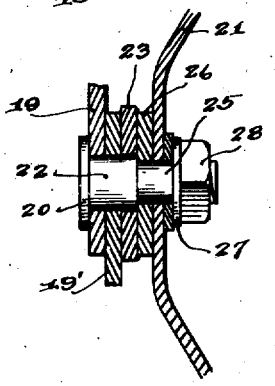
Figure 3 is an enlarged sectional view on the line 3—3 of Figure 1 showing the common pivotal mounting for the bell crank levers and the guide for the longitudinally shiftable actuating bar.

The embodiment of the invention illustrated on Figures 1 to 3 inclusive comprises a vehicle door 10 having a window opening 11 in which is mounted a window glass or panel 12 for vertical sliding movements between positions covering and uncovering the window opening. The side edges of the window glass are embraced by the usual guide channels 13 for guiding the window movement. Embracing the lower edge portion of the window glass 12 is a channel member 14 to which is secured a pair of laterally spaced depending retainers 15 and 15'. Each retainer has a longitudinally elongate slot 16 provided with an enlarged opening 17 to enable assembly of the stud 18 fixed to the free end portions of the swinging arm bell crank levers 19 and 19'.

The bell cranks 19 and 19' constitute parts of the window regulator mechanism and it will be observed that these bell crank levers are substantially identical with each other. Each bell crank lever has a relatively long arm $x$ and a short arm $y$ integrally connected by an angle portion $z$. To afford additional clearance, the long arm $x$ of each lever has a slightly offset or angular portion $o$ to militate against the levers abutting each other during their swinging movements near the extreme upper and lower positions of the window glass.

The inner ends of the bell crank levers 19 and 19' are mounted for pivotal or swinging movements about a common pivot and as shown, a stud 20 extends through an opening in an outwardly embossed portion 21 of a mounting plate or panel 21$a$ and has a shoulder portion 22 which fits openings in the inner ends of the levers 19 and 19'.

Swinging movement is imparted to the bell crank levers 19 and 19' by a longitudinally slidable bar 23 which, in this instance, is movable in a plane at substantially right angles to the plane of movement of the window glass 12. Although the actuating bar 23 is herein shown as being moved at substantially right angles to the direction of window movement, it is to be understood that this arrangement may vary but in each case it may be said that the actuating bar moves in a plane crosswise of the plane of window movement.

The outer end portion of the bar 23 is formed with an elongate slot 24 through which the stud 20 extends, the sides of the slot 24 engaging the shoulder portion 22 of the stud as indicated on Figure 3. As shown in Figure 3, the stud 22 has a reduced end portion 25 and interposed between the inner side of the panel embossing 21 and the bar 23 is a washer disc 26. Washer 27 and a nut 28 engage the stud 20 on the opposite side of the panel embossing 21. From the above it will be manifest that not only does the stud 20 afford a common pivotal mounting for the inner ends of the bell crank levers 19 and 19' but also assists in guiding the longitudinal sliding movement of the actuating bar 23.

Adjacent the inner end of the elongate slot 24 and fixed to the bar 23 as by welding is a cross piece 29 which is disposed at substantially right angles to the bar 23 and has portions projecting upwardly and downwardly beyond the edges of the bar. A link 30 pivotally connects the upper end of the cross piece 29 to the angle portion *z* of the bell crank lever 19 and a link 31 pivotally connects the downwardly projecting end portion of the cross piece 29 with the angle portion *z* of the bell crank lever 19'. A stud 19*a* is fixed to the arm 19' and is journaled in the link 31 and a stud 29*a* is fixed to the cross piece 29 and is also journaled in the link 31.

It will thus be apparent that upon movement of the bar 23, the bell crank levers 19 and 19' are caused to swing about the stud 20 as an axis and thereby impart movement to the window glass 12, the studs 18 on the free or outer ends of the levers sliding in the horizontal slots 16 in the retainers. It will be understood that upon movement of the bar 23 to the left of Figure 1, the force exerted by the links 30 and 31 cause the bell crank levers 19 and 19' to swing in a clockwise and counterclockwise direction respectively, thereby causing the window glass 12 to slide downwardly toward its fully open position. Movement of the bar 23 to the right of Figure 1 causes movement of the bell crank levers in the opposite direction to effect upward or closing movement to the window glass.

As shown, a spiral spring 32 has its inner end anchored to a slotted portion of the stud 19*a*. The convolutions of the spring 32 from the stud 19*a* extend in a counterclockwise direction with each convolution spaced slightly from the next outer convolution. From the convolute portion of the spring 32 extends a spring arm 32*a* having an upwardly bowed portion 33. The free end portion of the spring arm winds in a counterclockwise direction about the stud 29*a* and is anchored in the slot as indicated. When the spiral spring and its arm are mounted, the free end of the arm 32*a* is forced toward the spring 32, thereby causing the arm to bow as shown. It will be understood that when the bar 23 is moved to the left to cause downward movement of the window glass 12, the clockwise movement of the arm 19' effects a winding up or coiling of the spiral spring 32 so that when the bar 23 is actuated in the opposite direction to effect raising of the window glass 12, the spring 32 assists in that movement.

The operation of the spiral spring 32 and its spring arm 32*a* is important inasmuch as it greatly facilitates the action of the regulator. Assuming that the window glass 12 is in its lowered or open position as indicated by the broken lines on Figure 1, it will be understood that the spring arm 32*a* exerts a downward component of force against the bell crank 19' tending to rotate it in a counterclockwise direction. At the same time the spiral spring 32 having been placed under tension or coiled during the downward swinging movement of the bell crank 19', exerts a component of force likewise urging the bell crank in a counterclockwise direction, thereby materially aiding in the initial raising or closing movement of the window glass 12. As the bell crank 19' continues its counterclockwise movement, and when the long arm or arm *x* is in a substantially horizontal position and the short arm *y* of the bell crank 19' is in an up and down position, the spring arm 32*a* then exerts a downward component of force against the stud 19*a* but due to the position of the short arm *y*, such force is ineffective since it is a direct downward force against the stud 20. At that time, however, the link 31 and the short arm *y* of the bell crank 19' are at substantially right angles affording a more favorable leverage arrangement, so that the spiral spring 32 can then exert a more effective lifting force to the bell crank 19'. It is thus apparent that although the spring arm 32*a* is at this time virtually ineffective, the spiral spring 32 exerts a greater lifting force due to the more favorable leverage arrangement. As the bell crank 19' approaches its upper limit of travel, the spiral spring 32 gradually loses its force due to the fact that it is being unwound but the link 31 and the short arm *y* of the bell crank 19' gradually approach a substantially straightened toggle condition. This affords a greater mechanical advantage so that although the spiral spring 32 is weaker, the leverage condition becomes more favorable and as a result, the lesser spring force is compensated for by the greater leverage force. This greater leverage force due to the toggle condition, is to some extent offset by the downward component of force exerted by the spring arm 32*a*. As a result of the lever conditions, spiral spring and the spring arm, the lifting force is substantially uniform throughout the upward travel of the window glass 12. On the other hand, the downward movement of the window glass is resisted throughout its travel by a substantially uniform spring resistance. Due to the open coil condition of the spiral spring 32, the frictional resistance of the spring during winding and unwinding is virtually eliminated.

In this instance, manual means is provided for imparting longitudinal movement to the actuating bar 23 and for this purpose, the inner end portion of the bar is formed with rack teeth 34 on the under side thereof and meshing with the teeth 34 is a pinion 35 which is operated by a shaft 36 to which is fixed a crank handle 37. If desired, any clutch mechanism 38 well-known to those skilled in this art, may be employed for holding the parts in adjusted position and since the clutch or brake 38 forms no part of the present invention, detail illustration and description are not considered necessary. The pinion and associated parts may be carried by a mounting plate 39 and fixed to the mounting plate is a stud 40 which engages in an elongate guide slot 41 on the inner end portion of the bar 23 and thereby assists in guiding the rectilinear or longitudinal movement of the actuating bar 23. The mounting plate as shown, is adjustable vertically or at substantially right angles to the actuating bar 23 in order to effect alignment of the window glass in its channels.

Figure 4:
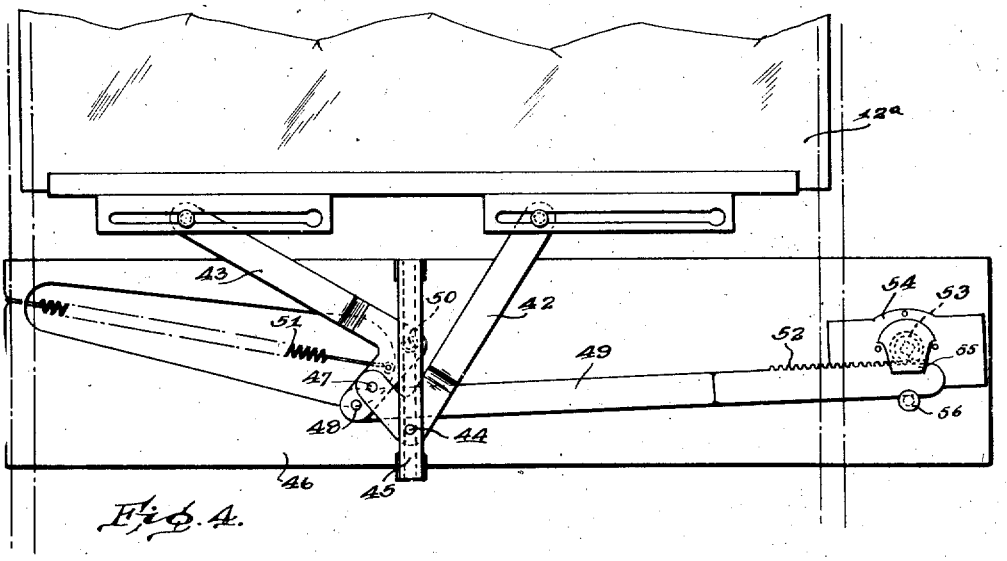
Figure 4 is a side elevation of another form of regulator mechanism mounted in a vehicle door showing the window in its raised or closed position.
Figure 5:
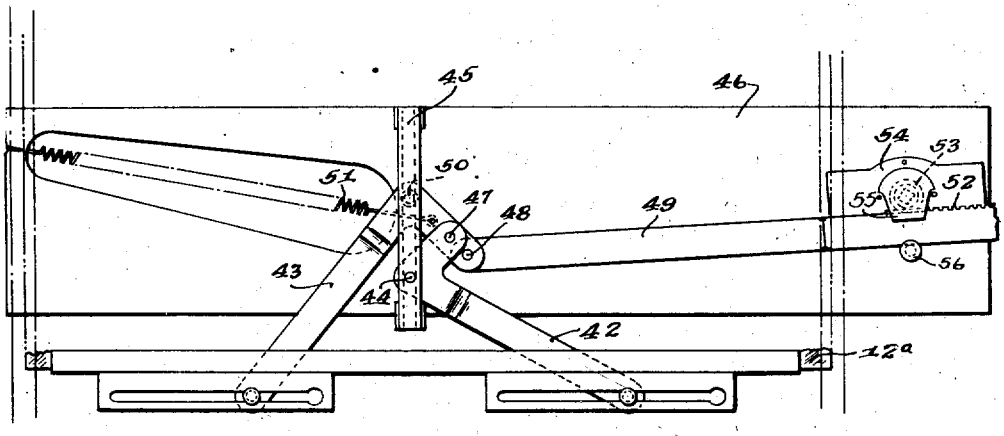
Figure 5 is a view similar to Figure 4 but showing the window in its lowered or open position.

In the embodiment illustrated on Figures 4 and 5, bell cranks 42 and 43 operate in a manner similar to the bell cranks 19 and 19' above described, it being observed that the outer or free ends of the levers have studs engaging in horizontally elongate slots in retainer members depending from the window glass 12*a*. The angle portion of the bell crank lever 42 is connected by a pin 44 to an upright channel member 45 which is carried by a mounting plate 46. The inner end of the bell crank lever 42 is pivotally connected at 47 to the inner end portion of the bell crank lever 43 but at a point spaced slightly inwardly from the extreme end thereof. The extreme inner end of the bell crank lever 43 is pivotally connected at 48 to an actuating bar 49 which also is rectilinearly movable in a plane crosswise of or in this instance, at substantially right angles to the plane of movement of the window glass 12*a*. The angle portion of the bell crank lever 43 has a stud 50 which is slidable in the channel provided in the channel bar 45. A helical coil spring 51 has one end anchored to the bell crank lever 43 intermediate the pivotal point 47 and the stud 50. The opposite end of the spring 51 has a hook engaging the end portion of the mounting plate 46.

The outer end portion of the actuating bar 49 has rack teeth 52 with which a pinion 53 is engageable. It will be understood that a similar crank handle (not shown) may be employed for operating the pinion 53, the latter being carried by a mounting plate 54. An embossed portion 55 on the mounting plate 54 provides a tongue engaging the upper side of the actuating bar 49 and a stud 56 engages the opposite side of the bar thereby to guide the longitudinal or rectilinear movement of the bar.

In operation of the regulator mechanism above described, it will be understood that swinging movement of the bell crank levers 42 and 43 is effected in response to longitudinal movement of the bar 49 in one direction or the other thereby raising or lowering the window glass 12*a*. During this movement the lever 42 swings about its pivot 44 and the stud 50 carried by the lever 43 slides vertically in the channel provided by the guide bar 45. Upon downward movement of the window glass 12*a*, the spring 51 is placed under tension thereby to assist in the upward movement of the window glass 12*a*.

From the above description, it is manifest that I have produced an exceedingly simple and efficient regulator mechanism which can be manufactured on a production basis at a relatively low cost. The structure occupies a minimum of space within the door or body structure and can be readily and conveniently mounted in position of use. The arrangement is such that throughout the up and down travel of the window glass, approximately the same movement is imparted at all times to the glass for the same movement of the crank handle, thus eliminating objectionable jerkiness in window movement which is an objection inherent in window regulators presently in use. The counterbalancing spring feature is outstanding because it does not render the regulator difficult in operation at one point and extremely easy in operation at another point. On the contrary, the regulator operates substantially uniform throughout its entire movement.

It is to be understood that numerous changes in details of construction, arrangement and operation may be effected without departing from the spirit of the invention especially as defined in the appended claims.

What I claim is:

1. Vehicle window regulator mechanism comprising a pair of bell crank levers for sliding engagement at the free ends thereof with a window panel, a common pivot for the opposite ends of said levers, an actuating member movable rectilinearly in a plane crosswise to the plane of movement of the window panel, and an operative connection between said actuating member and said bell crank levers for imparting swinging movement to the latter in opposite directions from rectilinear movement of the former, said operative connection including an articulated connection between said actuating member and an intermediate portion of each bell crank lever.

2. Regulator mechanism for a vehicle window guided for sliding movement between positions covering and uncovering a window opening, said mechanism comprising a pair of interconnected bell cranks engageable at their free ends slidably with the window, a common pivot for the opposite ends of said bell cranks, means to impart conjoint swinging movement in opposite directions to said bell cranks, said means including a bar movable rectilinearly in a direction crosswise to the plane of window movement, and an articulated connection between said bar and the angular portion of each bell crank.

3. Regulator mechanism for a vehicle window guided for sliding movement between positions covering and uncovering a window opening, said mechanism comprising a pair of swinging bell crank arms, pivotal mounting means interconnecting the adjacent ends of said arms, means on the free ends of said arms adapted for engagement with an edge portion of the window, spring means associated with the angular portion of at least one of said arms adapted to be placed under tension upon movement of said arms in one direction thereby to assist in movement thereof in the opposite direction, an actuating member connected to operate said arms and mounted for shifting movements in a plane crosswise to the plane of movement of the window, and link means providing a connection between said actuating member and the angular portion of each bell crank arm.

4. Regulator mechanism for a vehicle window comprising a pair of bell crank levers adapted for engagement at their free ends for window movement, a common fixed pivotal mounting for the opposite ends of said levers, a rectilinearly shiftable actuating bar, said bar having an elongate slot to receive said pivotal mounting for assisting in guiding the movement of the bar, means providing operative connections between said bar and the angle portions of said bell crank levers respectively, and spring means for counterbalancing said levers.

5. Regulator mechanism for a vehicle window comprising a pair of bell crank levers adapted for engagement at their free ends for window movement, a common fixed pivotal mounting for the opposite ends of said levers, a rectilinearly shiftable actuating bar, a cross piece projecting from opposite sides of said bar, links pivotally connecting projecting portions of said cross piece with angle portions of said bell crank levers respectively, and a spiral spring having one end anchored to the angle portion of one bell crank lever and having its opposite end anchored to the adjacent link.

6. Regulator mechanism for a vehicle window comprising a pair of bell crank levers adapted for engagement at their free ends for window movement, a common fixed pivotal mounting for the opposite ends of said levers, a rectilinearly shiftable actuating bar, a pair of links providing operative connections between said bar and the angle portions of said levers respectively, an open coil spiral spring having its inner end anchored to the angle portion of one lever, an integral arm on the outer end of said spring having its opposite end anchored to the opposite end of the adjacent link, and said arm being bowed in a direction toward the window thereby to tension same.

7. Regulator mechanism for a vehicle window guided for sliding movement between positions covering and uncovering a window opening, said mechanism comprising a pair of swinging bell crank arms, pivotal mounting means for the inner ends of said arms, means on the outer or free ends of said arms adapted for engagement with an edge portion of the window, spring means associated with the angular portion of at least one of said arms adapted to be placed under tension upon pivotal movement of said arms in one direction thereby to assist in movement thereof in the opposite direction, an actuating member connected to operate said arms and mounted for shifting movements in a plane crosswise to the plane of movement of the window, and link means providing a connection between said actuating member and the angular portion of each bell crank arm.

8. Regulator mechanism for a vehicle window guided for sliding movement between positions covering and uncovering a window opening, said mechanism comprising a pair of swinging bell crank arms, pivotal mounting means for the inner ends of said arms, means on the outer or free ends of said arms adapted for engagement with an edge portion of the window, an actuating member connected to operate said arms and mounted for shifting movements in a plane crosswise to the plane of movement of the window, link means providing a connection between said actuating member and the angular portion of each bell crank arm, an open coil spiral spring having its inner end anchored to the angle portion of one lever, and an integral arm on the outer end of said spring having its opposite end anchored to the opposite end of the adjacent link means, and said arm being bowed in a direction toward the window.

JOHN B. PARSONS.

REFERENCES CITED

The following references are of record in the file of this patent:

UNITED STATES PATENTS

| Number | Name | Date |
|---|---|---|
| 2,212,220 | Zwierzina | Aug. 20, 1940 |

FOREIGN PATENTS

| Number | Country | Date |
|---|---|---|
| 328,249 | France | Apr. 24, 1903 |
| 331,283 | Italy | Oct. 31, 1935 |
| 335,097 | Germany | Mar. 26, 1921 |
| 607,317 | Germany | Dec. 21, 1934 |
| 397,873 | Great Britain | Sept. 25, 1933 |